(No Model.)
2 Sheets—Sheet 1.

G. P. KISTNER.
DISK CULTIVATOR.

No. 564,524.

Patented July 21, 1896.

Witnesses

Inventor,
George P. Kistner.
By James L. Norris.
Atty.

(No Model.) 2 Sheets—Sheet 2.
G. P. KISTNER.
DISK CULTIVATOR.
No. 564,524. Patented July 21, 1896.
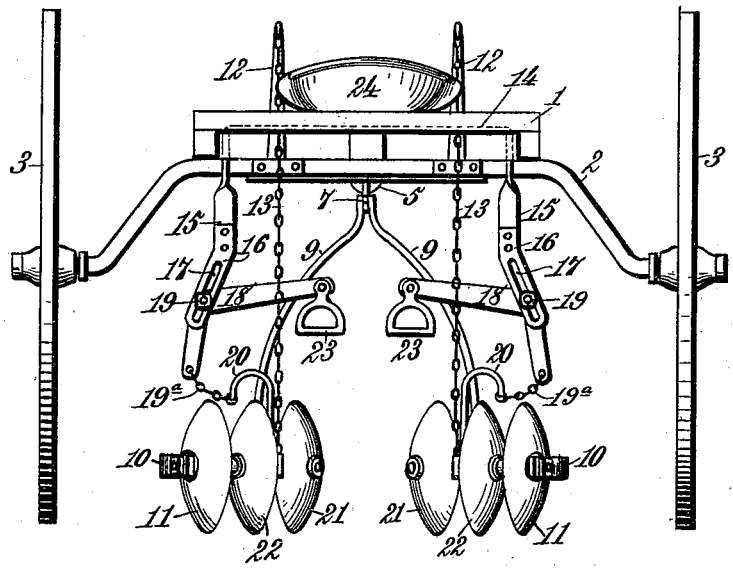
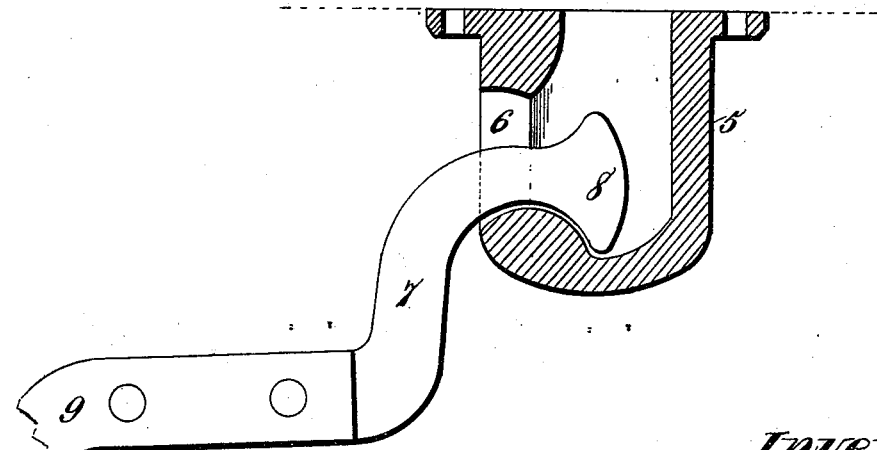
Witnesses
Robert Everett
[signature]
Inventor
George P. Kistner
By James L. Norris
Atty.

UNITED STATES PATENT OFFICE.

GEORGE P. KISTNER, OF LOW MOOR, IOWA.

DISK CULTIVATOR.

SPECIFICATION forming part of Letters Patent No. 564,524, dated July 21, 1896.

Application filed January 21, 1896. Serial No. 576,321. (No model.)

*To all whom it may concern:*

Be it known that I, GEORGE P. KISTNER, a citizen of the United States, residing at Low Moor, in the county of Clinton and State of Iowa, have invented new and useful Improvements in Disk Cultivators, of which the following is a specification.

This invention relates to disk cultivators, and has for its object to provide improved means controlled by the feet of the operator for bodily shifting the gangs of disks laterally to dodge the corn; and to this end my invention consists in the novel features and in the construction or combination of parts hereinafter described, and pointed out in the claims following the description, reference being had to the accompanying drawings, forming a part of this specification, wherein—

Figure 1:
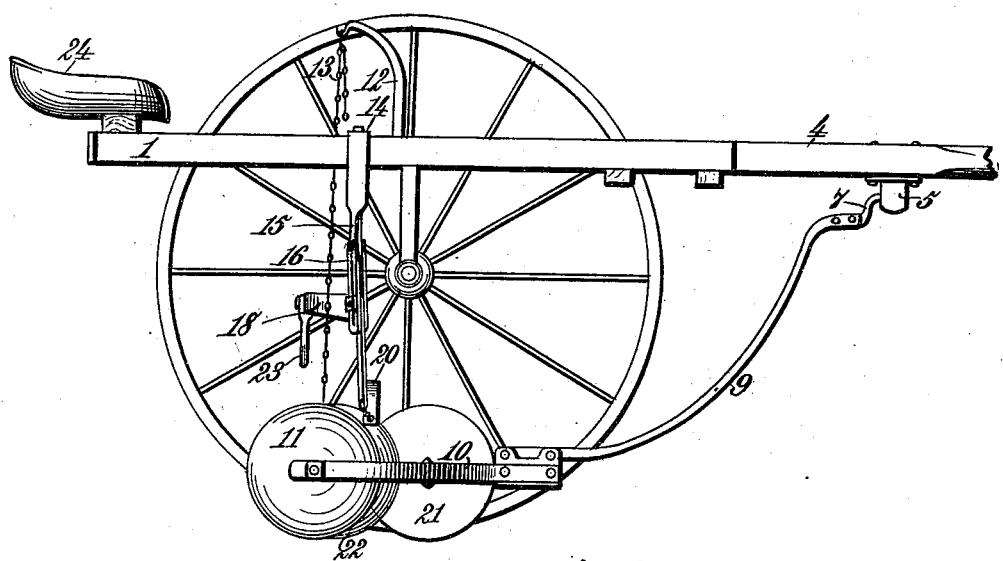
Figure 2:
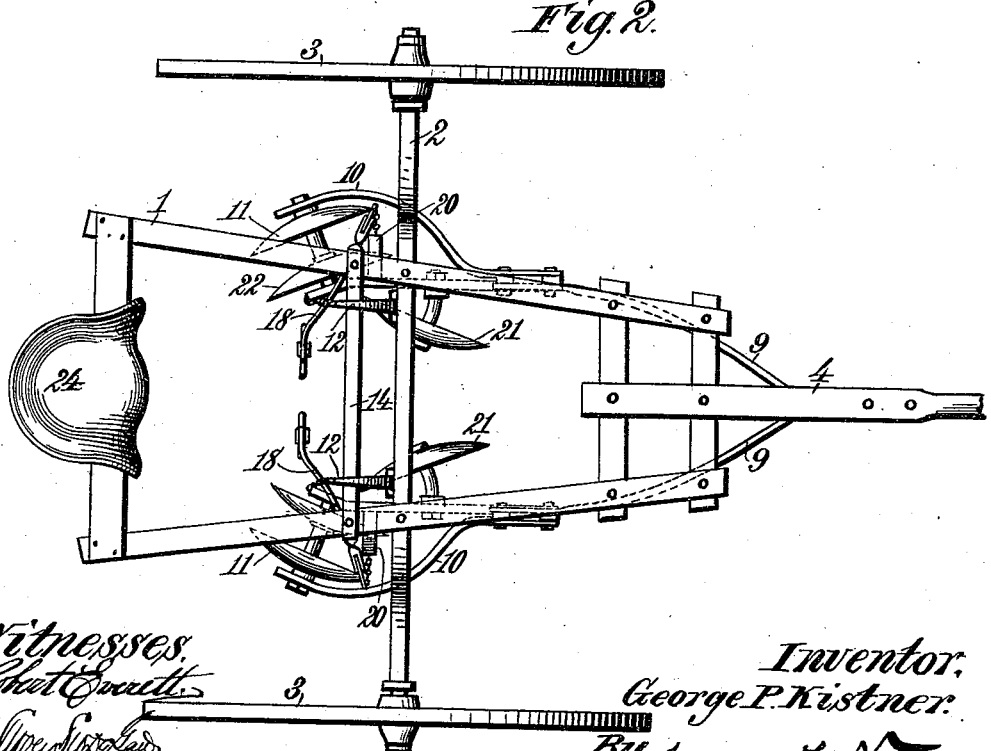

Figure 1 is a side elevation of my improved cultivator, one of the ground-wheels being removed. Fig. 2 is a top plan view thereof. Fig. 3 is a rear elevation of the same; and Fig. 4 is a detail view, partly in section, of the socket and hanger for coupling the disk gangs to the tongue.

The improved cultivator is particularly serviceable in cultivating corn planted in checkrows, the corn in such case being planted in parallel rows and in rows at right angles to such parallel rows. In practice it is almost impossible to plant the cross rows in fairly straight or parallel rows, rendering it necessary to provide the cultivating implements with means under the control of the operator for shifting the cultivators laterally to dodge the crooked rows, and the mechanism which I will now describe is especially designed for effecting this movement of the cultivators with great rapidity and little exertion on the part of the operator.

Referring to the drawings, the numeral 1 indicates the frame of a cultivator, mounted upon an axle 2, that is journaled in ground-wheels 3, and to the forward end of said frame 1 is rigidly attached a draft-tongue 4. Attached to the under side of the tongue 4 is a hollow socket 5, having an aperture 6, through which projects the neck of a hanger 7, having a rounded head 8, that has a loose bearing in the socket 5. Bolted or otherwise suitably secured to the foot of the hanger 7 are two diverging and rearwardly-extending arms 9, having bolted to their rear ends frames 10, each of which carries a gang of cultivator-disks 11, that are of ordinary construction and are journaled in said frames. The socket 5 and hanger 7 constitute a ball-and-socket coupling or universal joint, whereby the two gangs of cultivator-disks may be adjusted vertically to regulate their penetration, and may be shifted laterally to either side of the line of draft to dodge the corn. For the purpose of effecting the said vertical adjustment of the gangs of cultivator-disks, I provide arms 12, that are attached to the frame 1 and are provided with upper hooked ends to which are adapted to be adjustably hooked the upper ends of chains 13, which at their lower ends are attached to the frames 5. It will be manifest that by altering the points of attachment of the chains to the hooked arms the depth to which the cultivator-disks will penetrate the soil can be regulated.

Bolted to the frame 1 is a transverse bar 14, having depending arms 15, each of which is twisted or bent torsionally to cause their flat sides to lie in planes converging toward the center of the machine. To the opposite sides of each of said depending arms are bolted two coincident and angularly-shaped brackets 16, that are slotted, as at 17, the slots in the corresponding brackets registering one with the other. Disposed between each pair of brackets 16 is a bell-crank lever 18, that is pivotally secured thereto by a bolt 19, that passes through the slots 17 and through a perforation in said lever 18, and is secured in place by a nut, key, or cotter-pin, as may be preferred.

To the lower ends of the bell-crank levers 18 are attached short chains 19[a], that are in turn attached to arch-shaped hangers 20. There is one of said arch-shaped hangers for each gang of cultivator-disks 11, each hanger being bolted to its corresponding gang-frame at a point between the inner disk 21 and the central disk 22, and is arched over the latter disk and connected at its end to the end of the corresponding bell-crank lever 18 by chain 19, as before described. To the opposite ends of the bell-crank levers 18 are attached stirrups 23, that hang within convenient reach of the feet of the operator when seated in the driver's seat 24, secured to the rear portion of the frame 1.

The operation of my improved cultivator is as follows: The cultivator straddles the row of growing corn, and as it is drawn over the field the cultivator-disks operate to break and throw up the soil in the usual manner. By depressing with his feet either one of the bell-crank levers 18, the operator is enabled to instantaneously shift the corresponding gang of cultivator-disks 11 away from the line of draft to dodge the corn. It will be apparent that in those cases wherein the hills or rows of corn are very crooked or uneven the cultivators must be shifted with rapidity to dodge the corn, and it is the rapidity and ease with which the cultivators may be shifted with a direct side movement that forms one of the chief advantages of my improvement.

The bell-crank levers are journaled in slotted bearings, as shown, to permit of the usual vertical adjustment of the cultivator-gangs.

Having described my invention, what I claim is—

1. In a disk cultivator, the combination with a wheeled frame 1 and two gangs of cultivators 11 carried thereby, of the brackets 16 attached to the opposite sides of said frame, the oppositely-arranged bell-crank levers 18 pivoted to said brackets, arched hangers 20 affixed to said gangs, a flexible connection between said hangers and bell-crank levers, and stirrups 23 connected to the adjacent ends of the said bell-crank levers, substantially as described.

2. In a disk cultivator, the combination with a wheeled frame and two gangs of cultivators carried thereby, of slotted brackets attached to the opposite sides of said frame, oppositely-arranged bell-crank levers pivoted in said slotted brackets, means for connecting the cultivator-frames and bell-crank levers, and stirrups connected to the free ends of the said bell-crank levers, substantially as described.

3. In a disk cultivator, the combination with a wheeled frame 1 and two gangs of cultivators 11 carried thereby, of the slotted brackets 16 attached to the opposite sides of said frame, the oppositely-arranged bell-crank levers 18 pivoted in said slotted brackets, arched hangers 20 affixed to said gangs, a flexible connection between said hangers and bell-crank levers, and stirrups 23 connected to the adjacent ends of the said bell-crank levers, substantially as described.

4. In a disk cultivator, the combination with the wheeled frame 1 and two gangs of cultivator-disks 11, carried thereby, of the transverse bar 14 secured to said frame and provided at its opposite ends with depending arms 15, slotted, angular brackets 16 attached to said arms bell-crank levers 18 pivoted in said slotted brackets, arched hangers 20 each rigidly affixed at one end to one of said gangs and connected at its other end to the adjacent end of the corresponding bell-crank lever, by a flexible connection, and stirrups 23 connected to the other ends of said bell-crank levers, substantially as described.

In testimony whereof I have hereunto set my hand in presence of two subscribing witnesses.

GEORGE P. KISTNER.

Witnesses:
JOHN M. HEILMAN,
JOHN TATE.